United States Patent [19]

Haring

US005225748A

[11] Patent Number: 5,225,748

[45] Date of Patent: Jul. 6, 1993

[54] METHOD AND APPARATUS FOR CONTROLLING AND MONITORING THE POSITION OF AN AWNING OR SIMILAR FACILITY

[75] Inventor: Rolf E. Haring, Mossingen, Fed. Rep. of Germany

[73] Assignee: Somfy SA, Cluses, France

[21] Appl. No.: 765,902

[22] Filed: Sep. 11, 1991

[30] Foreign Application Priority Data

Mar. 23, 1990 [DE] Fed. Rep. of Germany ....... 4009373

[51] Int. Cl.[5] ......................... E05F 15/20; E06B 9/68; E06B 9/82; G05D 3/12

[52] U.S. Cl. .................................... 318/266; 318/286; 318/468; 160/7; 160/1; 49/31

[58] Field of Search ............... 318/266, 264, 265, 286, 318/466, 467, 468; 160/1, 2, 3, 4, 5, 7; 49/21, 31

[56] References Cited

U.S. PATENT DOCUMENTS

| | | | |
|---|---|---|---|
| 3,802,479 | 4/1974 | Newell, III et al. | 160/1 |
| 4,144,802 | 3/1979 | Babin | 160/5 |
| 4,349,011 | 9/1982 | Hartsog | 49/2 X |
| 4,784,204 | 11/1988 | Lohausen | 160/22 |
| 4,860,493 | 8/1989 | Lense | 49/279 |
| 5,038,087 | 8/1991 | Archer et al. | 318/469 |

*Primary Examiner*—Bentsu Ro

*Attorney, Agent, or Firm*—Darby & Darby

[57] ABSTRACT

It is proposed that the utilization period of the awning be increased in connection with automatic or manual manual control means in that the awning is preferably incrementally retracted as a function of the magnitude of the wind velocity, as determined through measurement, with the wind velocity being determined in corresponding graduations, and, as a function thereof, in that the control unit for the awning drive motor moves the awning to intermediate awning positions which have priority over all other control influences. In addition to the limit switches, which are present anyway and which indicate the "fully retracted" or "fully extended" positions, a plurality of intermediate sensors, corresponding to the number of desired increments, are disposed to determine the intermediate positions, with the signals output by the intermediate sensors, which indicate the actual position of the awning being compared with wind-velocity-determined awning setpoint position signals.

21 Claims, 4 Drawing Sheets

METHOD AND APPARATUS FOR CONTROLLING AND MONITORING THE POSITION OF AN AWNING OR SIMILAR FACILITY

This is a continuation of application Ser. No. PCT/EP91/00564, filed Mar. 23, 1991.

BACKGROUND OF THE INVENTION

The present invention relates to controlling and monitoring the position of an awning or shading system.

It is customary for shading systems, awnings or other comparable facilities, such as roll-up gates, roll-up shutters, etc., to have a type of suspended element or awning fabric which is wound onto a shaft and which can be more or less completely unwound from this shaft.

Aside from shading systems that are actuated in an entirely manual manner, which will not be the subject of further discussion herein, it is known prior art for the shaft or roller on which the awning fabric or any other web of fabric providing the shading is wound to be driven by an electric motor, which is switched off automatically in the limit positions of the awning. For this purpose, known electrically controllable awnings have corresponding limit switches which are customarily of electro-mechanical design and which must be adjusted as precisely as possible during installation in order to avoid blockage of the drive motor.

More highly automated control systems are known in conjunction with shading systems or awnings, and the term "awning" will be employed exclusively hereafter, without restricting reference to other applications of the present invention. When these more highly automated control systems are in the automatic mode, they extend the awning as a function of whether or not the sun is shining, with the effect of the sunshine being able to be determined by means of suitable photosensors or similar means.

In this connection, it is also known practice to make retraction or extension of an awning dependent upon the wind velocity, in addition to the presence of sunshine. Should the wind velocity exceed a stipulated value, which corresponds to an excessive wind load acting upon the quantity of awning fabric extended, the awning drive motor control unit is controlled in such a manner as to fully retract the awning. Since the known control unit can operate only in accordance with the "awning fully extended/awning fully retracted" principle, it poses the disadvantage that the primary function of the awing as a sun-shading system can often not be satisfied due to the rapid response of the control unit to protect the fully extended awning fabric against damage, even if the wind is light.

In another connection, it is already known practice (German Patent Disclosure Document 3,806,733) to dispose a sensor array to monitor and/or control a roll-up shutter sequence of pulses for every suspended element in that individual slats of the suspended element of a roll-up shatter have soft- or permanent-magnetic inserts adjacent to the sensor, with the sensor responding to them in the form of a reed switch, thus generating a sequence of pulses as the suspended element travels past the sensor. This sequence of pulses is compared with a sequence of pulses that is stored in a microprocessor, with the control signals required for switch-off in the respective limit positions being derived from the comparison. Analysis of the sequence of pulses that is generated by the travel of the suspended element enables individual adjustment to be simplified and might enable automatic compensation to be made for any lengthening of the suspended element which occurs over the course of time; however since this known monitoring and control drive system deals merely with the problems that result in connection with roll-up shutters, it does not address awning-typical problems which result from sunshine and/or wind velocity.

It is the object of the present invention to increase the utilization period of an awning, even if a wind force effect is determined which would otherwise cause the awning to be fully retracted, while simultaneously ensuring that the respective wind force effect always has priority, regardless of the mode in which the awning control system is being operated (automatic or manual), i.e. to ensure under all circumstances that wind forces acting upon the awning or the awning fabric will not damage the awning or the awning fabric.

SUMMARY OF THE INVENTION

In accordance with the present invention, an awning retains its function as a sunshading system even in the presence of a wind velocity of a given magnitude to which the control system must, of necessity, respond. In this case, the control system decides that, while the awning will be retracted, it will be retracted only to a position in which the correspondingly reduced surface area of the fabric is able to assume the wind load acting upon it in a trouble-free manner, i.e. in which it can be ensured that the fabric will not be damaged. Consequently, while simultaneously maintaining its function as a sunshading system, an awning which is partially retracted in this manner can have a greater resistance, and sometimes a significantly greater resistance, to wind.

An additional advantage of the present invention is that the response and the inclusion of the wind data has absolute priority within the entire awning control mechanism; i.e. depending upon the prevailing wind velocity, the awning can be extended only far enough for its wind resistance to withstand the load, as ensured on the basis of comparison values or of basic values that were entered at the time of adjustment, even if the awning is being manually actuated. As it is being extended, the awning will then automatically stop at stipulated locations, even if the extension command continues to be sustained. The same also applies in the case of fully automatic operation of an awning, i.e. in the case of those awnings which, when manually set for this fully automatic mode, extend automatically when sunshine is present for a stipulated period of time. In this case, as well, the respective wind velocity is included in the extension process, and the limit position of the awning is determined on the basis of the respective maximum wind load that can be withstood.

It is obvious that a control system of this nature can operate in a completely analog manner; however a quantized awning response is preferred, in which the awning is retracted incrementally, as a function of the magnitude of the wind velocity, thus enabling the control system to also operate in a digital manner.

It is therefore advantageous to stipulate only four awning extension positions, for example, if it can be assumed that the wind velocity is never relatively constant anyway, so that this rather rough classification—and, of course, a finer classification would also be within the scope of the present invention—eliminates the need for constant corrections of the awning position as a function of wind velocity.

If the wind velocity values are classified as a) no wind,
b) light wind,
c) average wind,
d) heavy wind, it is also advantageous that only two additional position switches, which are associated to center awning positions, are required in addition to the limit switches for the two limit positions, which are present anyway in a normal awning control system, so that the following meaningful association results, without any major effort being required therefor:

if there is no wind, the awning is fully extended;
if there is light wind, the awning is approximately one-third retracted;
if there is average wind, around two-thirds of the awning's length is retracted; while
if there is heavy wind, the awning is fully retracted.

It is obvious that other match-ups are also possible, depending upon the design of the awning, the strength of the fabric, local wind conditions, etc., which can be implemented in a trouble-free manner by appropriately adjusting the two center intermediate positions, especially with respect to the sensors.

In a preferred embodiment of the present invention, these two additional intermediate sensors for the intermediate awning positions can be integrated in additional limit switch-off means in the form of rapid limit-position switch-off means ("cage rapide"), which can be installed in the wind-up tube at the end opposite the drive. Rapid switch-off means of this nature have a mechanical memory which stores the position of the wind-up shaft, up to a given number (e.g. 10 revolutions) beyond an actual switch-off point. If a limit switch of this nature is employed to store the two center intermediate positions, it can be freely set by the end user. In this connection, adjustment of these positions is not critical because, in addition to being able to be freely set, the respective wind velocities upon which the settings are based will always vary within a given range, so that it would be neither meaningful nor necessary to operate with more precise values.

The present invention may employ a mini-computer, a microprocessor or a suitably designed logical calculating circuit in conjunction with memory means, with information pertaining to sunshine, wind velocity and the respective position of the awning being supplied thereto in the form of external sensor signals.

From this information and appropriate instructions in the form of suitable programming, the awning control unit thus formed is then able to stipulate four different awning positions, given the four position sensors that are present, as a function of the appropriately quanticized wind velocities, which can be determined by an anemometer, for example.

BRIEF DESCRIPTION OF THE DRAWINGS

The above discussed and other objects, features and advantages of the present invention will become more apparent from the following description thereof, when taken in connection with the preferred practical examples shown in the accompanying drawings, in which

FIG. 4 shows a possible embodiment of a flow diagram for determining the position of the awning on the basis of the available sensor signals; while

DESCRIPTION OF THE PREFERRED EMBODIMENT

Figure 1:
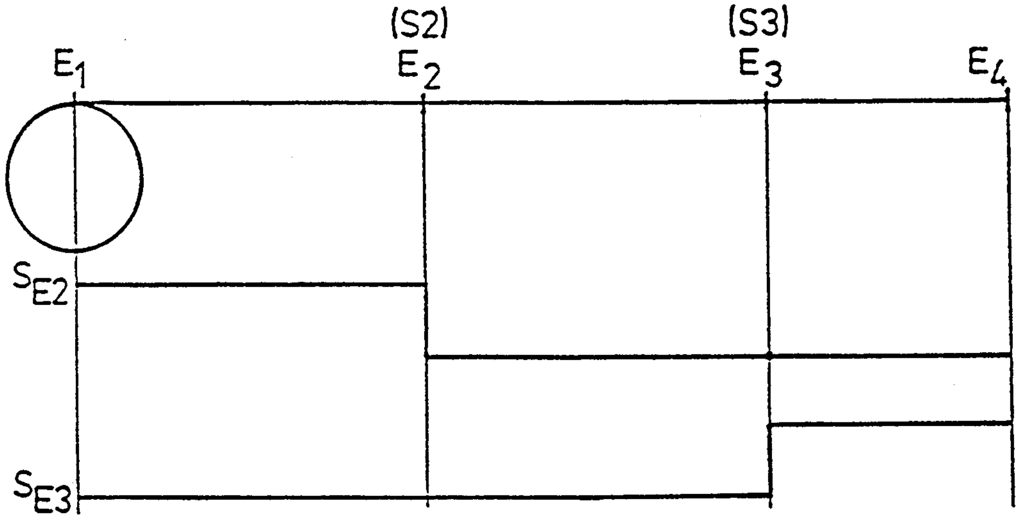
FIG. 1 shows a highly schematicized wind-up tube of an awning, with the awning fabric extended, and four different positions, which are controlled as a function of wind, as well as sensor signal paths therebelow for the two intermediate positions.

Referring now to the drawings, where like reference numerals designate like parts throughout the several views, the underlying concept of the present invention is to establish intermediate positions, which relate to the respectively prevailing wind velocity, in a power-driven awning and/or shading system, thus ensuring that its optimum function as a sun control system is maintained, while simultaneously affording optimum protection of the awning against the wind load acting upon it.

In this connection, a preferred embodiment of the present invention includes the quantized, i.e. incrementally effected, positioning motion of the awning throughout the entire length of extension travel, so that, as illustrated in more detail on the basis of a simplified practical example described below, intermediate position sensors are disposed, which detect two intermediate positions E2 and E3 here, in addition to fully retracted limit position E1 and fully extended limit position E4, in addition to the two limit switches (retracted position—maximum extended position), which are integrated in the control means of a power-driven awning anyway (FIG. 1).

Two additional sensors are disposed for this purpose, which, in a simplified embodiment, are designed and circuited in such a manner that one sensor which responds to a position E2 adjacent to the wind-up tube supplies an increasing signal, i.e. a signal that rises electrically from 0 to high, when this position E2 is exceeded while the awning is being retracted, with the sensor then maintaining the high output signal; when the awning is extended, the sensor output signal analogously changes from high to 0 when position E2 is exceeded in this direction of travel.

The second position sensor is then employed to determine intermediate position E3, which is located approximately between position E2 and fully extended limit position E4, as indicated in FIG. 1; it is designed in such a manner as to change a high output signal to 0 when the awning is retracted and when the awning is extended in the opposite direction, whereby, as can also be seen from the illustration in FIG. 1, the signal from the intermediate sensor for position E2, which will hereinafter be denoted sensor $S_{E2}$, is high between positions E1 and E2 and is zero between positions E2 and E4, while sensor $S_{E3}$ is zero from position E1 to position E3 and is high between positions E3 and E4.

Figure 4:
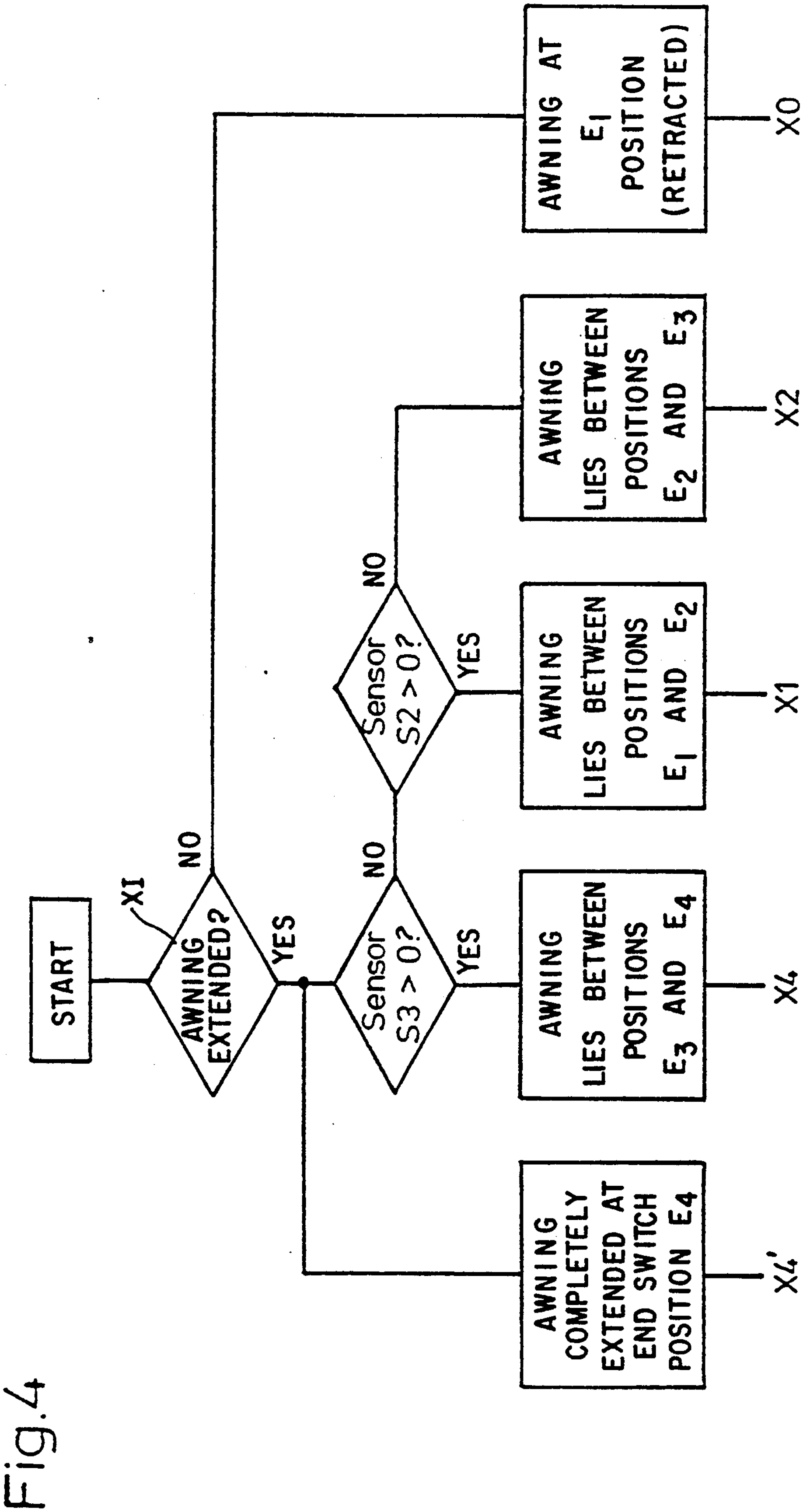

This enables trouble-free discrimination between the total of four awning positions E1 to E4 which are disposed here, as can also be seen from FIG. 4.

In this connection, it is necessary to distinguish between two additional aspects:

The awning can be located in any position, including a manually stipulated position, for example, when wind of a given strength occurs.

The awning assumes a given position, either automatically or under manual control, while it is subject to the effect of the wind.

In the first case, the sensor signals are, of necessity, constant, and can, as illustrated in FIG. 4, be discriminated for determining the position of the awning, while in the second case the sensor signals jump, i.e. either increase or decrease, when positions E2 and/or E3 are reached and exceeded, enabling the appropriate drive control signals for the motor to be obtained in this manner.

The two intermediate sensors can be designed in any desired manner; preferably, they comprise electromechanical switches, which respond to the respectively stipulated number of wind-up shaft revolutions and which then change state.

Figure 3:
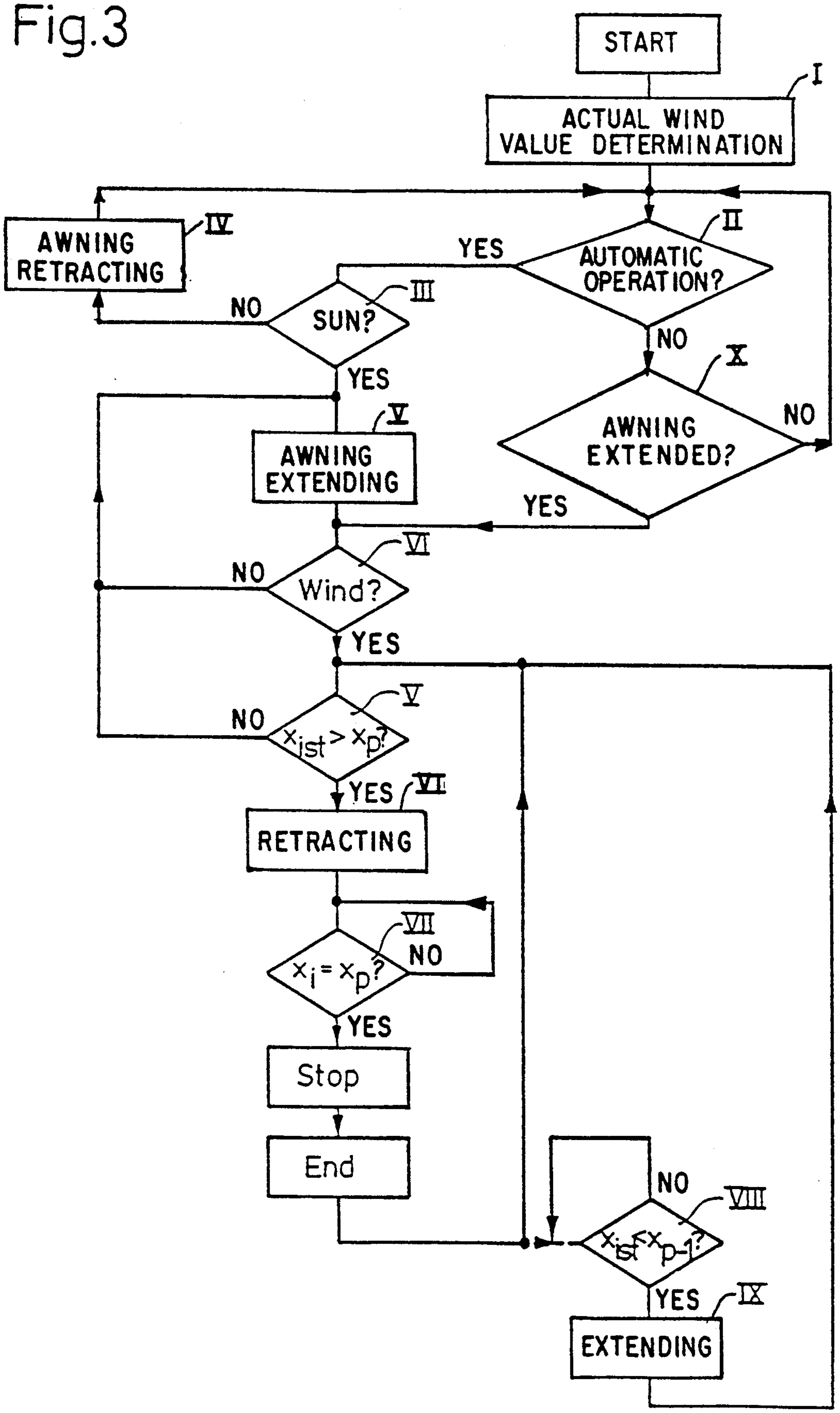
FIG. 3 shows a possible embodiment of a flow diagram portraying the sequence of the awning control under the effect of sun and wind.

A simplified flow diagram, which illustrates the basic control sequence according to a possible embodiment of the present invention, is shown in FIG. 3; on the basis of a wind sensor block, which will be described in greater detail below on the basis of the diagram shown in FIG. 5 and which provides to an analog control circuit or to a microprocessor four setpoint values for the awning position, for example, which are a function of the respective wind velocity, it is first determined at decision block II whether the awning control system is in the automatic mode or whether manual intervention has been or is being made.

If the awning control system is in the automatic mode, it is possible to determine at decision block III whether sunshine is present or not. If no sunshine is present, the awning is retracted via cycling block IV; if the sun is shining, an extension command is sent to the awning in accordance with block V, however as a function of wind conditions, which have absolute priority. Consequently, decision block VI determines whether or not there is a wind effect; should this be the case, sensor block I compares the setpoint position $x_p$ prescribed for these wind conditions with the actual awning position $x_{act}$. If the actual position is beyond the setpoint position, the control unit determines, via cycling block VI, that the awning will be retracted until decision block VII determines that the actual position of the awning essentially coincides with the setpoint position for the wind velocity. If this is the case, further travel of the awning is stopped and the present procedure is completed. However, since the wind conditions can change at any time, the loop returns to the input of decision block V and constantly monitors whether the actual position of the awning that has now been assumed still coincides with the wind conditions or whether it will be necessary to further retract the position of the awning in view of a further increase in the wind velocity.

Here, as illustrated by the dashed line in FIG. 3, it is additionally possible to dispose a further decision block following completion of a first awning extension procedure; this decision block is denoted VIII and determines whether further extension of the awning will soon be possible when the wind velocity reduces or approaches zero. It is obvious that this decision block VIII is equipped in such a manner that an extension command will be sent only if the position setpoint stipulated by the present wind velocity is one increment greater than the actual position of the awning, so that the awning will actually be able to be extended to the next higher increment, i.e. from position E2 to position E3, for example, or from position E3 to position E4. In this case, an extension command to the next position increment is sent in accordance with block IX, with a loop simultaneously being formed to the input of block IV, which compares the new actual position of the awning with the new wind-related awning setpoint position that now exists.

Since the actual and setpoint data which are advanced to the respective cycling and decision blocks for processing are subject to constant change, decision block VIII can also ensure that, if a further extended position of the awning is possible in the case of wind that has become calm, the awning will then move to this new limit position, which is fully extended position E4 in the case of the four increments that have been selected here.

If the control system is not in the automatic mode, decision block X determines whether the awning is extended; if it is extended, the loop closes by returning to the input of decision block VI.

Figure 5:
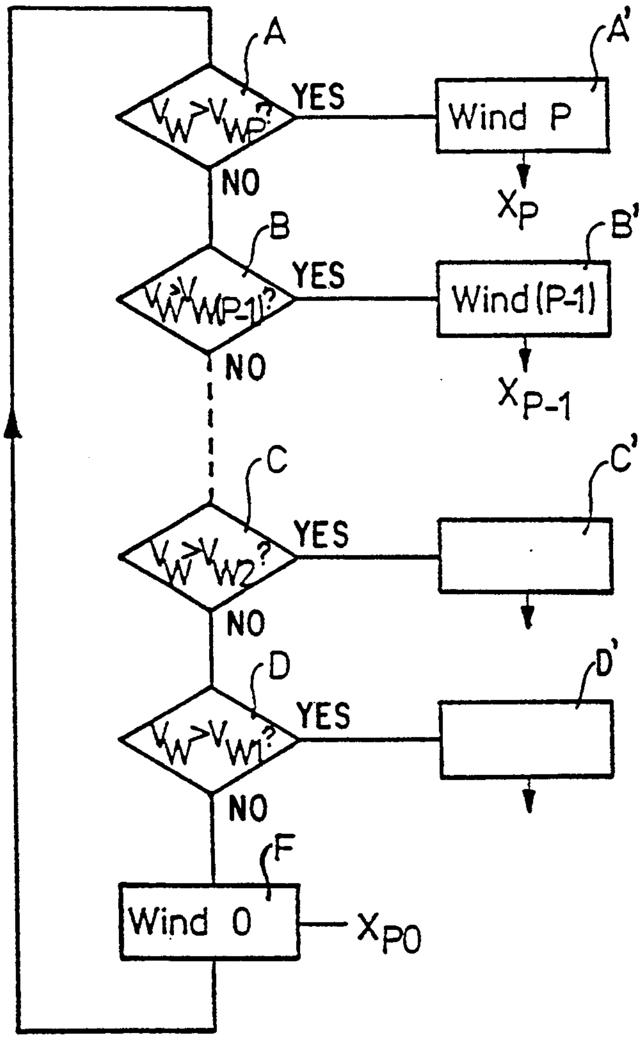
FIG. 5 shows a flow-diagram-like solution for sensing and quantizing the wind velocity $V_w$.

To quantize the wind parameters, it is possible, in accordance with the diagram shown in FIG. 5, to proceed in that the respective value of wind velocity $V_W$ that is measured at one of the plurality of decision or comparison blocks A, B, C, D, F, which can be window comparators in a discrete embodiment form and which correspond to the number of desired increments, corresponds to or exceeds stipulated wind threshold velocities $V_{Wp}$, $V_{W(p-1)}$ . . . Depending upon the result, converted position output signals $x_p$, $x_{p-1}$ are applied selectively to cycling blocks A', B', C' . . . , each of which is downstream of decision blocks A, B . . . , or it is also possible to produce a common output signal, whose amplitude differs as a function of the wind velocity acting upon the awning, which can then be employed for further processing. For example, an output voltage of 0 volts can be generated for calm wind, 2 volts for light wind, 4 volts for medium wind, etc.

In a comparable manner, it is possible to proceed in accordance with the diagram shown in FIG. 4, which generally corresponds to a flow diagram, in determining the actual awning position; a first decision block XI determines whether the awning is extended at all, which can be determined by one of the limit switches which are disposed anyway; if this limit switch has responded (awning fully retracted), the awning position is determined to be at E1 in accordance with FIG. 1, and the corresponding output travel signal can be $x_0$.

If the awning is extended, sensor signal $S_{E3}$ is checked; if this signal is high, for example, the location of the awning must be between positions E3 and E4; if there is zero potential at sensor S3, it is determined whether sensor S2 is showing a high potential. If this is the case, the the awning is between positions E2 and E3; if sensor S2 also shows zero potential, the awning must, of necessity, be between positions E2 and E3.

Determining the position in this manner enables the sensor signals to be analyzed in a trouble-free manner and the corresponding extension and retraction commands to be generated by the control unit; determination of the position in the manner shown in FIG. 4 is based upon a stationary state of the awning and also enables any desired intermediate awning position to be determined. On the basis of the output signals obtained in this manner, it is then determined whether these signals represent the respective wind-determined setpoint position signals $x_p$-Should there be variances, the awning then travels to the next closest position.

It is obvious that when the awning is being operated dynamically, e.g. if a manual extension command is given, the control unit responds to the change in signal, i.e. to the edge in the output signals from intermediate position sensors $S_{E2}$ and $S_{E3}$, respective, and, in this case, e.g. during extension, stops the awning immediately after it passes position E2 if the corresponding wind-determined position signal indicates predominantly average wind, which would allow extension only to this position.

The same also applies with respect to the other positions, whereby it can be seen that the awning will stop just behind the respective actual position signal if it is being retracted due to wind conditions.

The description thus far shows that the most meaningful approach is to operate with a high (log 1) or zero (log 0) signal in each case, which also makes it especially meaningful for decoding to be effected with the aid of a suitable diode matrix, as the various high or low output signals from the sensors or wind velocity conversion circuits can be advanced to corresponding inputs of a diode matrix which, after being appropriately decoded, provides the respective output signals, whereby a diode matrix of this type can contain a corresponding number of AND gates, each having a plurality of input connections, or any desired combination of other common gates.

Figure 2:
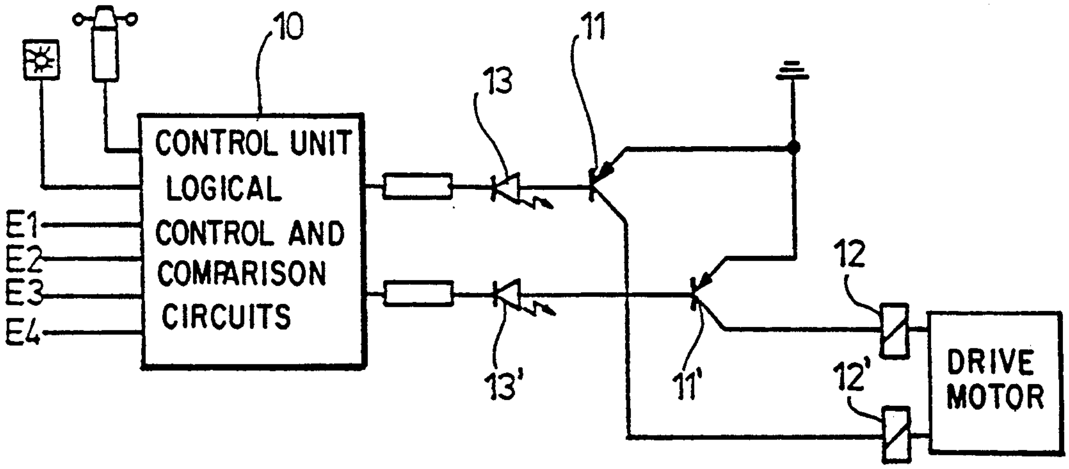
FIG. 2 shows, in schematicized form, a block diagram of a control unit to which external sensor signals are advanced and whose output controls the unillustrated drive motor of the wind-up tube via relay means.

It can also be advantageous to employ a memory, for example an EPROM, for the control decisions, with the respective operating conditions, i.e. wind-determined awning setpoints and position-determined actual awning positions, being supplied to the inputs of the memory in the form of an address, as well as a signal as to whether sunshine is present in the case of change-over to the automatic mode, with the memory then providing the output control signals in accordance with its addressed, stored values. Thus, the control unit 10 in FIG. 2 can be logical control and comparison circuit which include a suitable diode matrix encoding circuit or a microprocessor with memory (EPROM), or any other logical control circuit whose two outputs provide the control commands to the respectively downstream semiconductor switches 11 (for extension of the awning) and 11' (for retraction of the awning), which then control the drive motor in the one or the other sense of rotation via downstream relay switches 12 or 12', respectively. Semiconductors 11, 11' can be controlled via light-emitting diodes 13, 13', thus indicating the direction of travel to the outside on a display.

Since the retraction or extension travel of the awning affects intermediate position sensors S2 and S3 in a different manner—the sensor's output signal jumps either from high to low or vice versa—, it can be meaningful to set memories, as a function of the retraction or extension travel, with each of the memories retaining its one or the other control state until the corresponding sensor in the opposite direction is "passed"—This is also meaningful if the response behavior of the sensors is merely triggered by the awning travel, i.e. although the sensor triggers, its effect is cancelled as the awning continues to travel.

It is obvious that the position sensors can be designed in a variety of ways and need not necessarily comprise individual physical switches. A preferred possibility for implementing position sensors, for example, could also consist of providing a pulse-controlled wind-up shaft rotational speed incremental transducer, for example, or simply a counter which provides a signal E1, E2, E3 . . . that corresponds to the respective awning position when given counts are reached.

The present invention has been described above on the basis of preferred practical examples thereof. Obviously, many modifications and variations of the present invention are possible in the light of the above teachings. It should therefore be understood that, within the scope of the appended claims, the present invention may be practiced otherwise than as specifically described. In particular, individual characteristics of the invention can be employed individually or in combination one with the other.

What is claimed is:

1. An apparatus for controlling and monitoring the position of a roll-up suspended element which includes a fabric having a surface area capable of withstanding a wind load, the apparatus comprising:

drive means for driving the roll-up suspended element to selectively displace between retracted and extended positions;

sensing means for sensing a presence of wind velocity being at a given magnitude, the wind velocity creating a wind load when acting upon the surface area of the fabric; and control means responsive to said presence being sensed by said sensing means for permitting said drive means to retract the roll-up suspended element only to a position at which a correspondingly reduced surface area of the fabric is able to withstand the wind load acting thereupon without being damaged, said control means also being responsive to said presence being sensed by said sensing means for permitting said drive means to extend the roll-up suspended element only far enough for the fabric to withstand the wind load without being damaged.

2. An apparatus as in claim 1, further comprising:

detecting means for detecting a presence of sunshine;

extension directing means responsive to detection of the presence of sunshine by said detecting means for directing said drive means to extend the roll-up suspended element, said control means stopping said drive means from extending to roll-up suspended element beyond that which is only far enough for the fabric to withstand the wind load.

3. An apparatus as in claim 1, further comprising;

means for manually actuating the roll-up suspended element to selectively displace between extended and retracted positions, said control means stopping the manually actuating from allowing the roll-up suspended element to reach a retracted position at which the reduced surface area of the fabric is no longer able to withstand the wind load acting thereupon without being damaged and from allowing the roll-up suspended element to reach an extended position at which the fabric can no longer withstand the wind load without being damaged.

4. An apparatus as in claim 1, wherein said control means directs said drive means to selectively retract and extend the roll-up suspended element in an incremental manner between a plurality of positions based upon the magnitude of the wind velocity sensed by said sensing means.

5. A method for controlling and monitoring the position of a roll-up suspended element which includes a fabric having a surface area capable of withstanding a wind load, the method comprising the steps of:

driving the roll-up suspended element to selectively displace between retracted and extended positions;

sensing a presence of wind velocity being at a given magnitude, the wind velocity creating a wind load when acting upon the surface area of the fabric; and responding to said presence being sensed by permitting the step of driving to retract the roll-up suspended element only to a position at which a correspondingly reduced surface area of the fabric is able to withstand the wind load acting thereupon without being damaged, and responding to said presence being sensed by permitting the step of driving to extend the roll-up suspended element only far enough for the fabric to withstand the wind load without being damaged.

6. A method as in claim 5, further comprising the steps of:

detecting a presence of sunshine;

responding to detection of the presence of sunshine by directing the step of driving to extend the roll-up suspended element;

stopping the step of driving from extending the roll-up suspended element beyond that which is only far enough for the wind resistance of the fabric to withstand the wind load.

7. A method as in claim 5, further comprising the steps of;

manually actuating the roll-up suspended element to selectively displace between extended and retracted positions; and stopping the step of manually actuating from allowing the roll-up suspended element to reach a retracted position at which the reduced surface area of the fabric is no longer able to withstand the wind load acting thereupon without being damaged and from allowing the roll-up suspended element to reach an extended position at which the resistance of the fabric can no longer withstand the wind load without being damaged.

8. An apparatus as in claim 5, further comprising the steps of:

directing the step of driving to selectively retract and extend the roll-up suspended element in an incremental manner between a plurality of positions based upon a magnitude of the wind velocity sensed.

9. A method useful for controlling and monitoring the position of a roll-up suspended element which has a fabric and which travels between extended and retracted positions as a function of external parameters including wind velocity, the method comprising the steps of determining an extent of effective wind load, converting the determined effective wind load to a wind-load-dependent position setpoint for the roll-up suspended element, an extent to which the roll-up suspended element extends corresponding to a given quantity of the fabric of said roll-up suspended element, controlling travel of the roll-up suspended element so as to retract the roll-up suspended element as a function of a magnitude of said wind velocity and so as to prevent the fabric from being extended beyond a permissible setpoint position while said roll-up suspended element is being extended.

10. The method according to claim 9, wherein said setpoint position is stipulated by an actual value of said wind velocity and has absolute priority over any extension of travel of said roll-up suspended element in a presence of sunshine, further comprising the step of extending said roll-up suspended element only to a position which corresponds to a maximum respective wind load which is still acceptable in accordance with said setpoint position.

11. The method according to claim 9, further comprising the steps of quantizing both a determination of wind load parameters as well as a position of said roll-up suspended element so that retraction and extension of said roll-up suspended element are effected in an incremental manner.

12. The method according to claim 11, further comprising the step of sensing at least two stipulated intermediate positions between maximum allowable extended and retracted positions of said roll-up suspended element by sensors, each of the sensor output signals is flip-flopped in the one or the other direction during the moment said stipulated intermediate position is passed when said roll-up suspended element is being extended or retracted.

13. The method according to claim 12, wherein actual position information is supplied by said intermediate position sensors.

14. The method according to claim 13, wherein various intermediate sensor output signals are analyzed and employed for determining a stationary positional state of said roll-up suspended element, thus producing respective output signals for intermediate roll-up suspended element positions which are compared with said wind-load-dependent position setpoints of the roll-up suspended element.

15. The method according to claim 9, further comprising the step of determining a presence of sunshine, said roll-up suspended element being extended to a limit position which is stipulated by said wind-load-dependent position setpoint.

16. The method according to claim 15, further comprising the step of retracting said roll-up suspended element again at an end of a stipulated delay period if on sunshine is present.

17. The method according to claim 9, further comprising the steps of measuring the wind velocity in an incremental manner and converting the measured wind velocity into wind-determined position setpoint parameters for the roll-up suspended element.

18. The method according to claim 17, wherein said wind-determined position setpoint parameters are available in digital form and, together with digital intermediate sensor output signals, form addresses for use in generating respective control commands for a drive motor of a wind-up tube of the roll-up suspended element.

19. The method according to claim 9, wherein respective actual positions of the roll-up suspended element are continuously identified and an actual-value signal is output when stipulated positions are reached.

20. The method of claim 9 wherein the roll-up suspended element is an awning.

21. An apparatus useful for controlling and monitoring the position of a roll-up suspended element, comprising a control unit which is responsive to receipt of sensor signals pertaining to sunshine, wind velocity and actual roll-up suspended element position for determining a control state for a drive motor of a roll-up tube of the roll-up suspended element, intermediate position sensors disposed for producing the sensor signals pertaining to the actual roll-up suspended element position, two limit switches for indicating maximum retracted and maximum extended positions, comparison circuits disposed in said control unit for differentiating between at least two different wind velocities and derive wind-determined setpoint positions for the roll-up suspended element, means for supplying wind-determined setpoint position signals based on the derived wind-determined setpoint positions of the roll-up suspended element, and a logical control circuit disposed in said control unit for deriving a priority control signal to said drive motor from said wind-determined setpoint position signals supplied by said supplying means and from the actual roll-up suspended element position signals supplied from said intermediate position sensors, said priority control signal ensuring that said roll-up suspended element extends to an outermost, wind-determined setpoint position and avoids exceeding said outmost wind-determined setpoint position independent of any actuation of a roll-up suspended element control means.

* * * * *